(12) United States Patent
Bergholt et al.

(10) Patent No.: US 6,929,431 B2
(45) Date of Patent: Aug. 16, 2005

(54) VIBRATION-DAMPENED TOOL FOR WORKING IN METALLIC MATERIAL

(75) Inventors: Marie-Louie Bergholt, Sandviken (SE); Leif Karlsson, Karlholmsbruk (SE); Klas Tübinger, Järbo (SE)

(73) Assignee: Sandvik AB, Sandviken (SE)

( * ) Notice: Subject to any disclaimer, the term of this patent is extended or adjusted under 35 U.S.C. 154(b) by 4 days.

(21) Appl. No.: 10/454,602

(22) Filed: Jun. 5, 2003

(65) Prior Publication Data

US 2004/0028490 A1 Feb. 12, 2004

Related U.S. Application Data

(63) Continuation-in-part of application No. PCT/SE01/02691, filed on Dec. 6, 2001.

(30) Foreign Application Priority Data

Dec. 6, 2000 (SE) .............................................. 004525-2

(51) Int. Cl.[7] .............................................. B23B 51/02
(52) U.S. Cl. ..................... 408/143; 408/226; 409/141; 82/158
(58) Field of Search ................................. 408/143, 226, 408/227; 409/141; 175/320, 321, 322, 323; 82/158; 407/30, 53, 66

(56) References Cited

U.S. PATENT DOCUMENTS

| | | | | |
|---|---|---|---|---|
| 2,426,359 A | * | 8/1947 | Lankheet | 408/143 |
| 2,563,559 A | * | 8/1951 | Sneva | 83/835 |
| 2,610,529 A | * | 9/1952 | Atkinson | 408/59 |
| 2,641,940 A | * | 6/1953 | White | 408/143 |
| 3,230,833 A | * | 1/1966 | Shurtliff | 409/141 |
| 3,463,048 A | * | 8/1969 | Owsen | 409/141 |
| 3,812,755 A | * | 5/1974 | Danielsen | 83/835 |
| 4,591,009 A | | 5/1986 | Marcel et al. | |
| 5,372,548 A | | 12/1994 | Wohlfeld | |
| 6,076,999 A | | 6/2000 | Hedberg et al. | |

FOREIGN PATENT DOCUMENTS

| | | | | |
|---|---|---|---|---|
| DE | 3924696 | * | 2/1991 | B23D/77/00 |
| DE | 199 48 891 A1 | | 4/2001 | |
| EP | 0 090 929 A2 | | 10/1983 | |
| JP | 62-218044 | * | 9/1987 | B23B/51/00 |
| JP | 5-288707 | * | 9/1993 | B23B/29/02 |
| JP | 7-227711 | * | 8/1995 | B23C/5/10 |
| JP | 11-277308 | * | 10/1999 | B23B/29/02 |
| JP | 2002-79405 | * | 3/2002 | B23B/29/02 |
| RU | 1669638 | * | 8/1991 | 408/143 |
| RU | 1816538 | * | 5/1993 | B23B/27/04 |
| SE | 468 930 B | | 12/1990 | |
| SU | 1726148 A1 | | 4/1992 | |
| WO | 01/98008 A1 | | 12/2001 | |

OTHER PUBLICATIONS

Abstract of USSR 1726148 cited by Applicant.*

* cited by examiner

*Primary Examiner*—Daniel W. Howell
(74) *Attorney, Agent, or Firm*—Burns, Doane, Swecker & Mathis, LLP (57) ABSTRACT

A drill for working in metallic materials includes a tool body having located in its front end at least one cutting insert, wherein the tool body is provided with one or several damping elements mounted such that during machining, a relative movement (i.e., sliding and/or deformation) of the tool body and the damping element is allowed to occur.

8 Claims, 12 Drawing Sheets

VIBRATION-DAMPENED TOOL FOR WORKING IN METALLIC MATERIAL

This is a continuation-in-part of International Application No. PCT/SE01/02691 filed Dec. 6, 2001, the entire content of which is hereby incorporated by reference.

BACKGROUND OF THE INVENTION

The present invention relates to a drilling tool for working in metallic material, more precisely a tool of the type that comprises a tool body having at least one cutting insert exposed for working a workpiece. The tool may e.g. be formed as a drill having flutes extending in its longitudinal direction, which flutes join to the outer and inner inserts, respectively, in order to serve as grooves for chip release.

The present invention also relates to a damping device adapted to be arranged on a tool body.

At working of holes in metallic materials, problems arise with the high sound level caused by vibrations from the working and the machine sound. Hitherto known drills have not been provided with built-in/added damping devices formed in such a way that a suitable sound and vibration damping has been feasible. The essential thing is to be able to eliminate major parts of the vibration sound in the range that is uncomfortable to the ear. If possible, only the machine sound as well as the inevitable chip raffle which normally usually amounts to 74–76 dB should be left. However, without damping it is not uncommon that levels up to 130 dB have been measured. The proper machine sound feels more restful to the ear.

From SE-B-468 930 it is, for instance, previously known to form a drilling tool with a very stiff material, such as cemented carbide, disposed in the flutes which define the drill's chip channels, in order to stiffen the drill and thereby dampen vibration. However, the hard metal borders that result have not turned out to give any suitable silencing of noise.

SUMMARY OF THE INVENTION

In these circumstances, the aim of the invention is to provide a solution to the above-mentioned problem. According to the invention, a tool is provided for chip-working machining of metallic materials, comprising a holder body, supporting at least one cutting insert for active machining of a workpiece, wherein the holder body is provided with at least one damping element of a different or same material as the holder body. The tool has in its front end a portion provided with a cutting insert. The damping element is mounted on the holder body for movement relative thereto during a cutting operation.

It has also been solved by a damping device adapted to be arranged in a tool with a holder body provided in its front end with cutting insert. The damping device is shaped as an annular member, releasably or non-releasably connected to the holder body.

Hereby there is achieved an apparatus for a tool with substantially improved sound and vibration damping which is useful at drilling as well as at milling or e.g. interior lathing. As a result of this, the new tool permits a substantial reduction of the sound level caused by the proper metal working of the workpiece. At the same time, such a tool becomes less sensitive to vibrations, which arise by virtue of variations of the cutting forces.

DESCRIPTION OF THE DRAWINGS

Below, the invention will be described closer in connection with two embodiment examples of the invention illustrated in the drawings.

DESCRIPTION OF PREFERRED EMBODIMENTS OF THE INVENTION

The present invention stems from the realization that if a moving body (holder body) carries another body (carried body) which is permitted to move relative to the holder body during movement (e.g., rotation) of the carrier body, the relative movement will serve to dissipate energy and thus dampen vibrations and noise of the carrier body. By "relative movement" is meant not only relative sliding movement (which dissipates energy by the generation of friction that is converted into heat), but also deformation of the carried body (with or without sliding movement). Thus, if the carried body is formed of a medium (or a composite or a mix of materials, e.g., fluids, sand, plastics, rubbers, metals and cemented carbides) having less density and/or lower Young's modulus than the holder body (e.g., steel, tungsten) the carried body will tend to deform during acceleration/deceleration, and every part of the carried body that is deformed will dissipate energy (i.e., dampen vibration) through the generation of heat. The direction of the relative movement is not important as regards its vibration damping capabilities.

It is known to attach a stiffening element to drill bits to make the drill bit stiffer. In order to achieve the higher stiffness, the stiffening element is mounted so tightly on the drill body (e.g., by soldering) that relative movement cannot occur. The present invention involves securing the damping element such as to permit relative movement, e.g., friction and/or deformation. Securement can be by glue or vulcanization (which permits deformation) or screws that achieve a certain looseness (and thus movability) of the damping element. Thus, the invention is directed away from achieving greater stiffness of the drill.

Figure 1:
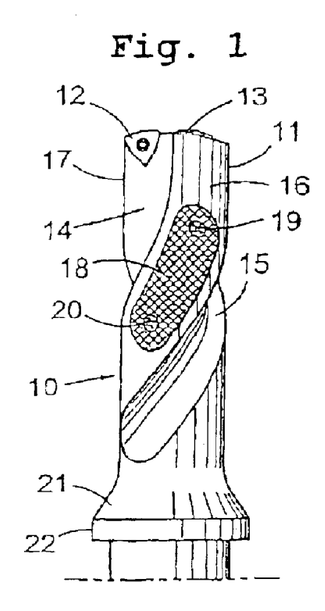
FIG. 1 shows a side view of a first embodiment of the tool.
Figure 7:
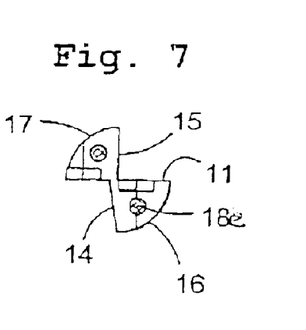
FIG. 7 shows an end view of the embodiment of FIG. 6.

The preferred embodiment shown in FIG. 1 is a drill 10 having damping elements 18 according to the present invention. The drill comprises a drill body 11 as well as an outer cutting insert 12 situated at the periphery of the drill and an inner cutting insert 13 situated closer to the center of the drill. The cutting inserts are preferably in the form of plates made of hard cemented carbide. The two cutting plates are situated in such a way at different radial distances from the drill axis A that their operating areas radially overlap each other. At the same time, said cutting plates are displaced about 180° in the circumferential direction of the tool as shown in FIG. 7. The cutting plates 12 and 13 are, in a known way, for instance by means of a center screw, fastened in a corresponding cutting pocket in the drill body 11. The drill body 11 has a substantially cylindrical basic shape and is made out of steel. The drill body 11 is, at the axially rear portion thereof, in the common way formed with a rear sectional thickening in the shape of a conical portion 21 which transforms into a rear portion 22.

At the portion of the drill body 11, situated behind the cutting inserts, the drill body is provided with axially extending, radially outwardly open flutes 14 and 15, which in cross-section are concavely curved and separately join with respective cutting plate 12 and 13. Said flutes 14, 15 are intended to serve as chip channels, and portions 16 and 17 of the drill body having a cylindrical envelope surface are situated between the flutes. In the embodiments illustrated in FIGS. 1–6, said chip channels 14, 15 are helical. Alternatively, the chip channels 14, 15 may have a straight design or a combination of helical and straight.

At a distance axially behind the cutting plates 12, 13, a damping medium in the form of an element 18 has been placed in the portion 16 in a corresponding recess (see FIG. 1). The damping element 18 may be composed of a material having a density and/or Young's modulus different from that of the drill body 11. Of importance is that the damping element 18 is arranged in its recess, such that during working, movement of the element 18 relative to the drill body 11 is allowed (i.e., sliding movement and/or deformation of the element 18 as discussed earlier), and that the connection of the damping element 18 is such that its envelope surface does not obstruct entry of the drill into the workpiece 3 in question. Due to the different densities and/or Young's modulus of the materials, the rate of compression of the damping element caused by acceleration and deceleration forces produced by the vibrations is different from that of the drill body. There thus results an elastic deformation (i.e., a relative movement) of the damping material relative to the drill body which consumes mechanical energy and converts it into heat. By reducing the amount of vibration producing mechanical energy in the tool, the amount of vibration will be reduced.

Likewise, any relative sliding movement between the contacting surfaces of the damping element and the drill body produces friction that is converted into heat, thus dissipating the energy of the tool.

The embodiment of FIG. 1 is such that the top surface of the damping element 18 becomes situated flush with, and has the same shape as, the adjacent outer surface of the drill body 11. That is, the damping element 18 has a shape that entirely or partly corresponds with the shape of the outer envelope surface of the body 11. The damping element 18 may, for instance, be fastened to the drill shank 11 by means of one or several screws 19, 20. Alternatively, the damping element 18 may be connected to the drill body 11 by gluing or vulcanization. Alternatively, the damping elements 18 may be shaped such that they completely or partly are enclosed in a dove-tail shaped cavity formed in the envelope surface of the drill body.

In the case where the damping element is attached to the drill body by gluing or vulcanization, the deformation of the vibration element will produce a deformation of the glue or vulcanized interface, which also dissipates energy.

Figure 2:
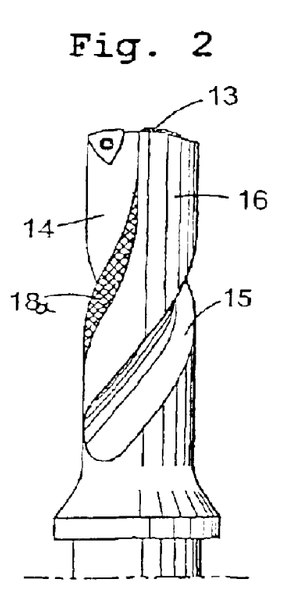
FIG. 2 shows a side view of a second embodiment of the tool.

In the embodiment of FIG. 2, the damping element 18a has an axial, helical extension such that it constitutes a part of the portion 16, but at the same time is formed such that it does not reduce the size of the chip channel 14. Also in this case the damping elements 18a may be connected to the drill body 11 (somewhat loosely) by means of one or several screws 19, 20, or be connected to the drill body 11 by gluing or vulcanization. The damping element 18a forms part of the wall of the respective flute.

In the same manner as regards the embodiment of FIG. 1, the top or envelope surface of the damping element 18a corresponds to the envelope surface of the portion 16. It is not necessary that the form of the damping element 18a exactly conforms to the outer shape of the body 11, i.e., the damping element need not be exactly flush with the envelope surface of the portion 16. On the contrary, the damping element 18a may e.g. be somewhat recessed in the portion 16. In the embodiment according to FIG. 3A, the damping element 18b extends all the way to the front surface of the drill body.

Figure 4:
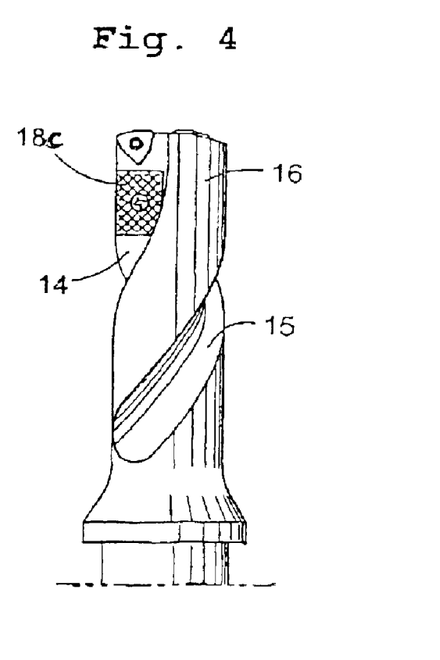
FIG. 4 shows a side view of a fifth embodiment of the tool.
Figure 5:
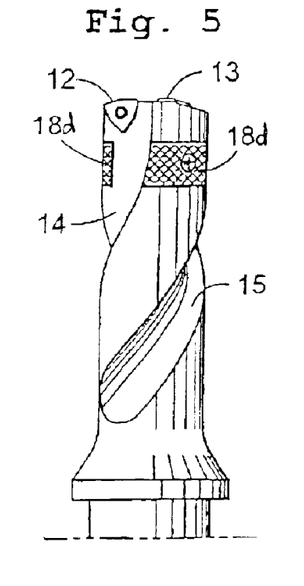
FIG. 5 shows a side view of a sixth embodiment of the tool.

In the embodiment of FIG. 4, the damping element has the shape of a plate 18c received in a recess in one of the flutes 14 such that the element's surface corresponds to that of the boundary surface of the flute. The damping elements 18d in FIG. 5 have the shape of plates, recessed in the circumferential direction of the envelope surface of the respective portions 16, 17. The damping elements have a convex envelope surface, substantially corresponding to the envelope surface of the portions 16, 17.

Figure 6:
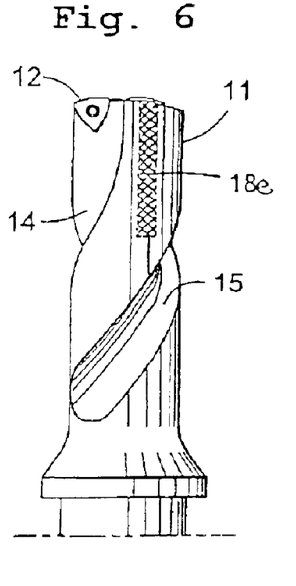
FIG. 6 shows a side view of a seventh embodiment of the tool.

In the embodiment of FIG. 6–7, the damping elements 18e have the shape of a pin or a tube, fastened in corresponding cavities in the drill body 11 by gluing or vulcanization. Alternatively, a stop member is introduced into the cavity, the stop member preventing the element 18e from being displaced out of the cavity, while simultaneously allowing the element to move (deform) inside the cavity, as explained earlier herein.

Figure 3A:
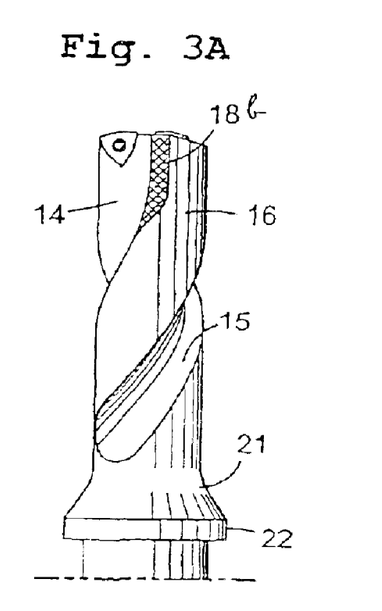
FIG. 3A shows a side view of a third embodiment of the tool.
Figure 3B:
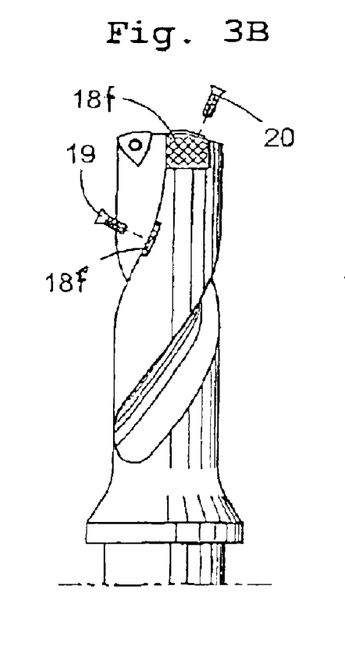
FIG. 3B shows a side view of a fourth embodiment of the tool.
Figure 3C:
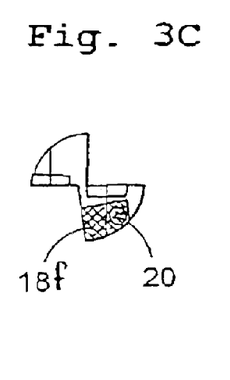
FIG. 3C shows an end view of the embodiment of FIG. 3B.

FIGS. 3B–3C show screwed-on damping elements 18f, the screws 19, 20 being connected to the drill body, while simultaneously allowing a relative movement of the damping element 18f and the drill body 11, respectively.

The cavities adapted to receive the pins 18e of FIGS. 6–7 may e.g. be the front end of cooling channels arranged in the tool for conducting cooling fluid. Between the damping pin 18e and the tool body, there may be present a material of e.g. elastomer, polymer, crude rubber or a glue compound and a sealing compound. Also combinations of these materials are possible. If it is desired to conduct cooling fluid through the channels, the damping pins 18e can be made hollow.

Figure 8:
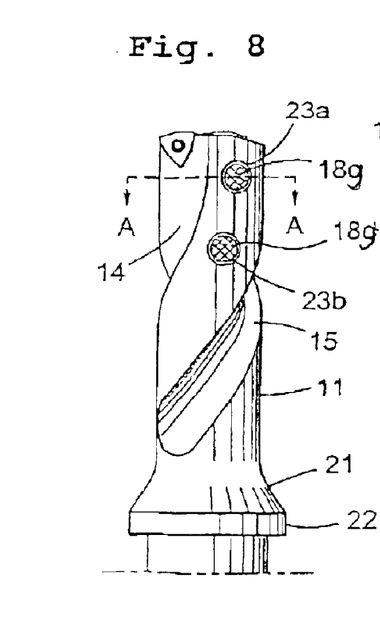
FIG. 8 shows a side view of another embodiment.
Figures 9, 10:
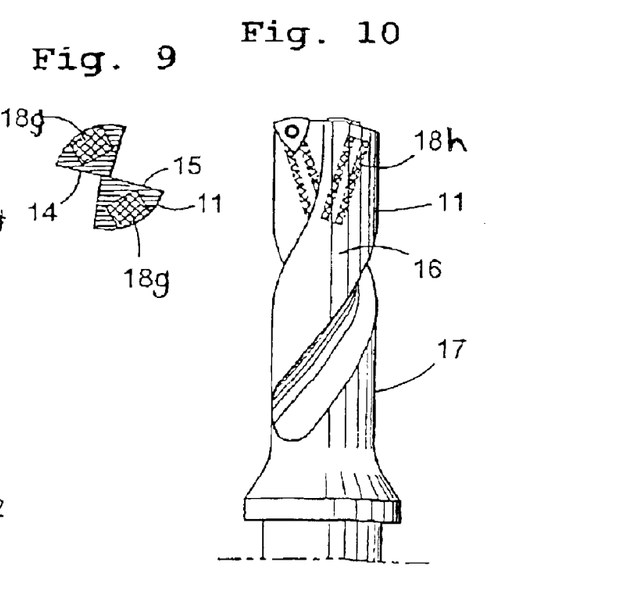
FIG. 9 shows a cross-section along the line A—A of a drill according to FIG. 8.
FIG. 10 shows an alternative embodiment.

In the embodiment according to FIGS. 8–9, the damping elements have been given the shape of cylindrical elements 18g, connected inside radial bores 23a, 23b by means of gluing, vulcanization or the like. Alternatively, the connection could be performed by means of peg devices extending along or across the element. The peg devices may comprise one or several, completely or partially penetrating pegs.

In the embodiment of FIG. 10, the damping elements have been given the shape of straight cylindrical, tubular pins 18h, received in bores that extend conically outwards in the front portion of the drill body portions 16, 17. The tube pins 18h are then received such that they become recessed in the bores by a distance from the front surface of the drill body, as is apparent from FIG. 10. Alternatively, e.g. a stop member could be introduced in the recess, the stop member preventing the element 18h from moving out from the cavity, but at the same time allowing the element to move (deform) inside the recess.

Figure 11A:
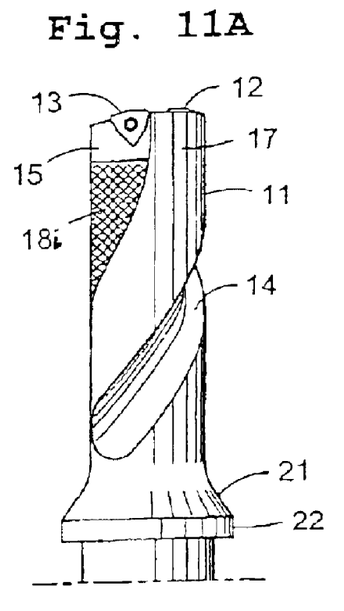
FIG. 11A also shows an alternative embodiment.
Figure 11B:
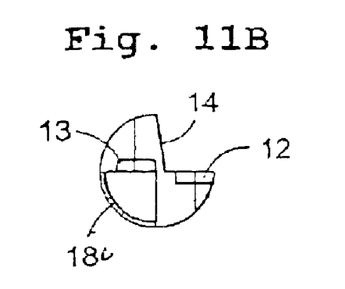
FIG. 11B shows an end view of FIG. 11A.

In the embodiment according to FIGS. 11A–11B, the damping element 18 has been given the shape of a partly cylindrical wall element, which has an outer surface flush with that of the drill body and which encloses the axial front portion of the flute 15. The design is then such that the axial extension of the element 18 terminates a distance axially behind the insert pocket that receives the inner cutting insert 13. Alternatively, the element 18i may extend all the way to the front surface of the drill. Connection can be by gluing, vulcanization, etc.

Figure 12A:
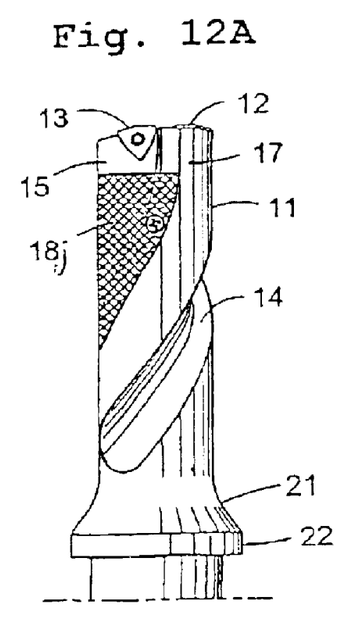
FIG. 12A shows another alternative embodiment.
Figure 12B:
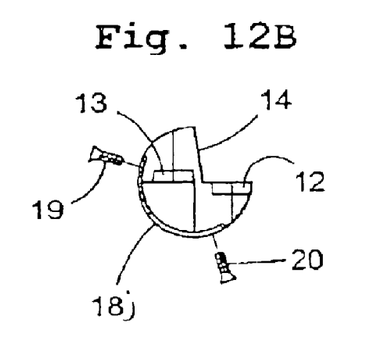
FIG. 12B shows an end view of FIG. 12A.

In the embodiment according to FIGS. 12A–12B, the damping element 18j extends past the flute in the circumferential direction to form end portions that are connected to the drill body by means of screws 19, 20, in accordance with the manner described above.

Figure 13:
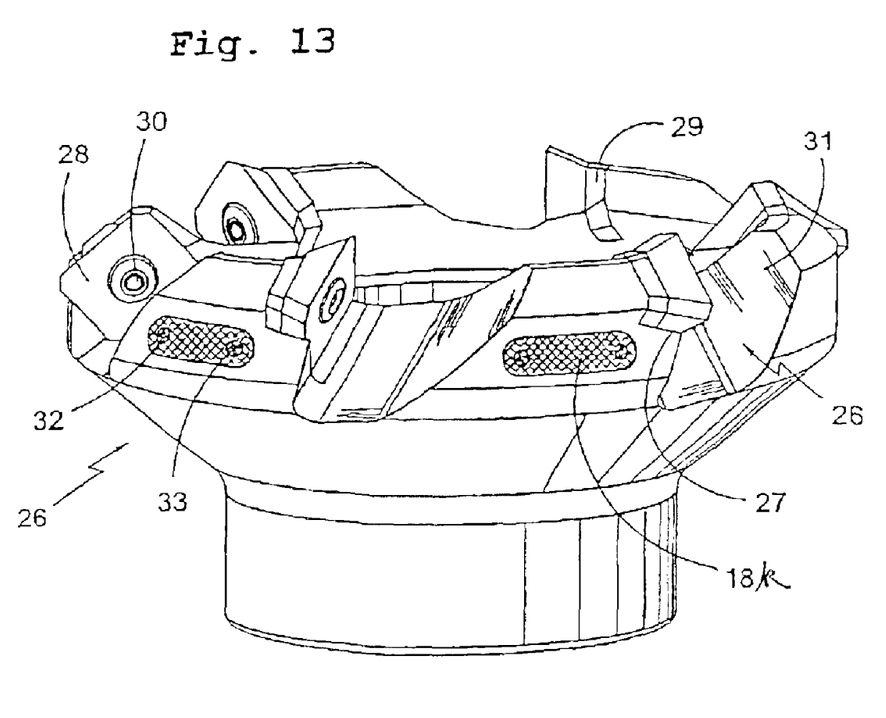
FIG. 13 shows a milling tool according to the invention.

In FIG. 13 is generally shown a milling body 26 with six insert sites 27. Mounted in each insert site are a mounted cutting insert 28 and a shim 29 which have been connected in the insert site by means of a locking screw 30. The cutting inserts are in this case functionally inclined with a positive axial angle in the milling body. In the direction of rotation, there is provided in front of each insert a milled chip pocket 31. On the envelope surface of the milling body 26, a number of damping elements 18k have been attached by means of screw elements 32, 33, allowing relative movement of the elements 18k and the milling body 26 during the milling operation. As can be seen, the elements 18k are attached to the milling body in positions at an axial distance behind the positions of the cutting inserts. The damping elements 18k constitute discontinuously formed sections of an annular damping element.

Figure 14:
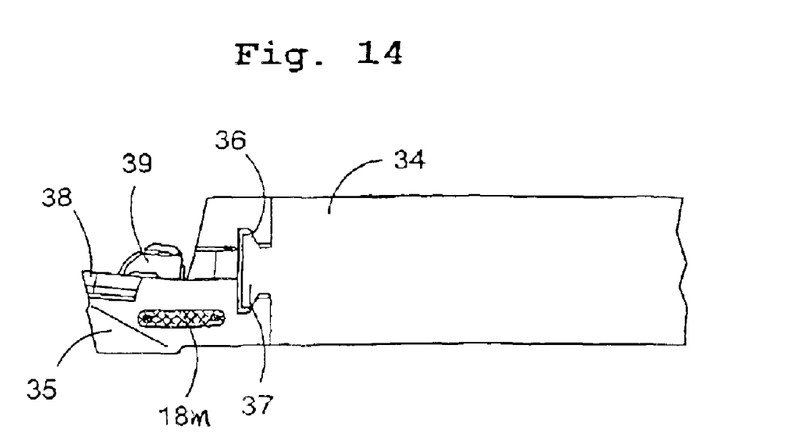
FIG. 14 shows a side view of a turning bar according to the invention.

In the embodiment shown in FIG. 14, for internal turning, the tool is composed of a bar 34 and a holder body in the form of a cutting head 35 arranged at the front end of the bar. The cutting head 35 is adjustable in a radial direction and is in the embodiment shown provided with a dove-tail slot 36 encompassing a corresponding tap or tongue 37 of the bar 34. The cutting head is provided with a cutting insert 38, fastened by means of a clamping element 39. A damping element 18m is attached to the exterior surface of the cutting head or is located therein (see FIGS. 6–10).

The damping element 18m may alternatively comprise particles, e.g., sand, granulate or a plurality of small bodies which are allowed to perform a movement relative to the tool and relative to each other. The damping body, or the particles may be completely or partially surrounded by a rigid, liquid or gaseous medium. A cover would be provided to retain the particles and the liquid or gaseous medium within the tool. As the particles slide along one another, friction is produced which is converted into heat to dissipate energy.

Figure 15:
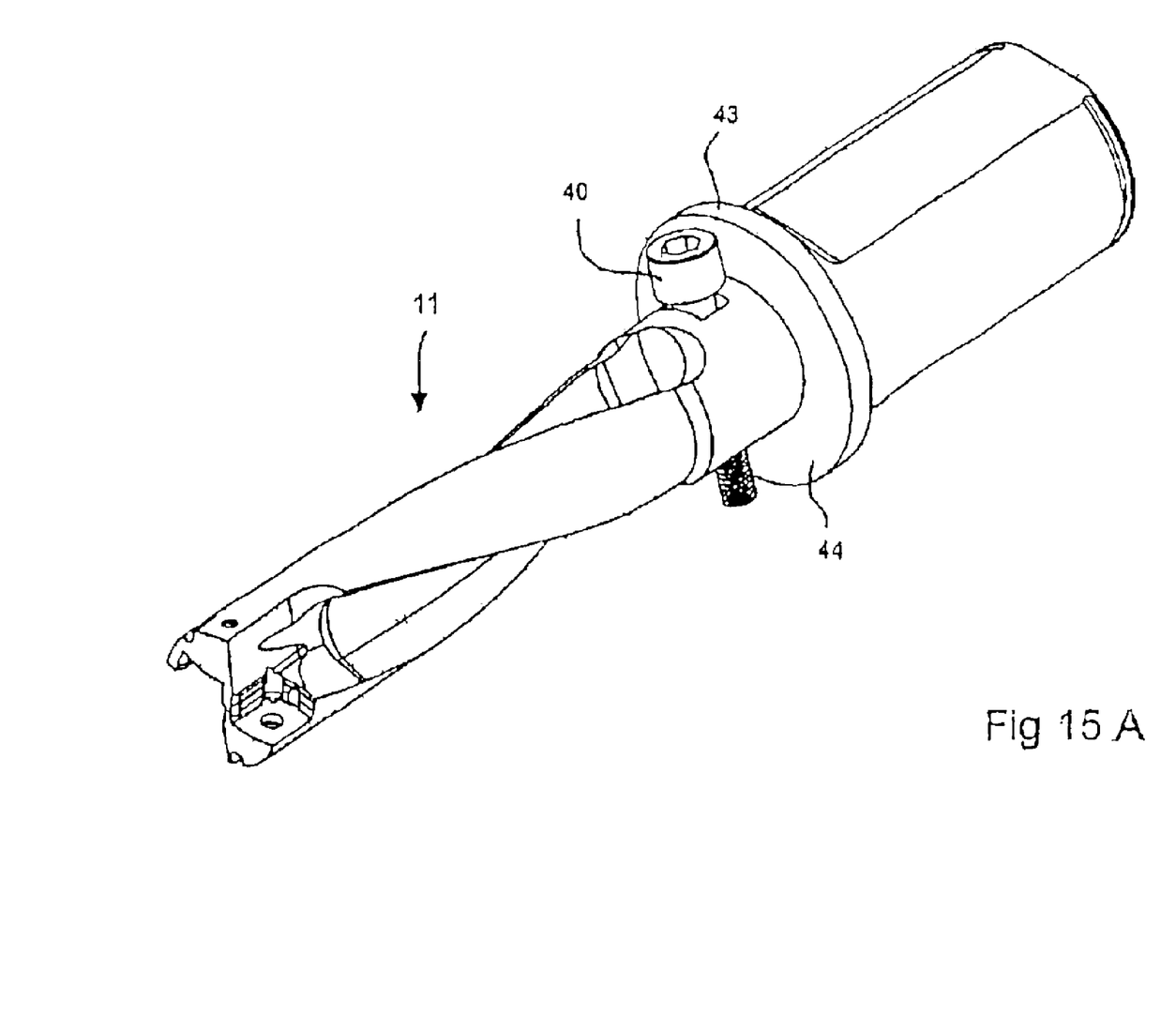
FIGS. 15A–15B show a drilling tool according to the invention.

FIGS. 15A–15B show a drill body 11 provided with a radially arranged screw 40. A circular cylindrical surface 43 and a flange having an annular, axially directed surface 44, constitute a seat for an annularly formed damping element 18n (see FIG. 15B). The screw is fastened relative to the drill body, but allows the damping element to perform a movement relative to the drill body.

Figure 16:
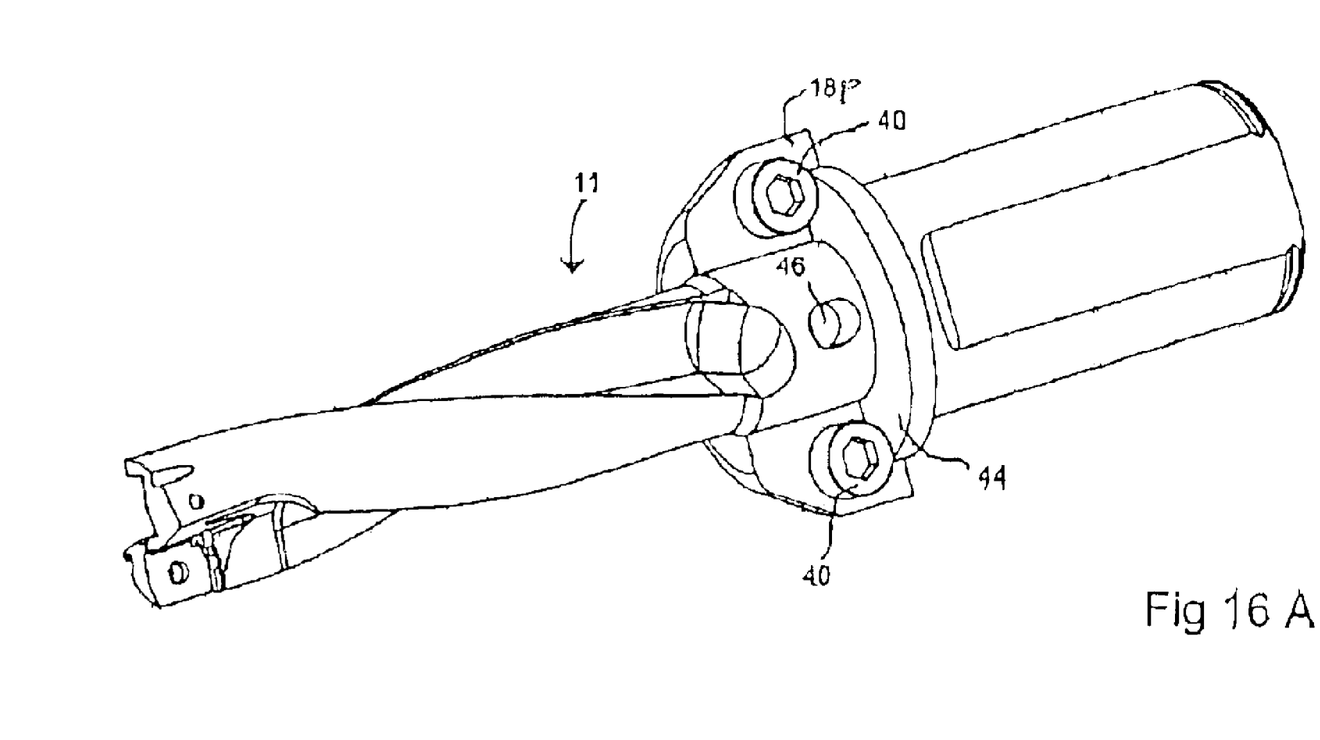
FIGS. 16A–16C show another embodiment of a drilling tool according to the invention.

FIG. 16A shows a drill body 11 provided with a semi-annular damping element 18p comprising two radially arranged screws 40.

FIG. 16B shows the half of the damping element 18p provided with a radially directed protrusion 44 adapted to be introduced in a corresponding recess or through-hole in the drill body. The protrusion 44 is preferably arranged centrally between the screws 40.

FIG. 16C shows the drill body 11 of FIGS. 16A, B including the other half of the damping element 18r, together forming an annular damping element. Also the half 18r has a protrusion to be introduced into a corresponding recess or a through-hole 46. When both halves of the damping element are put in place, they are connected relative to each other by means of the screws 40. The damping element is, however, allowed to perform a movement relative to the drill body, owing to the fact that the protrusion 44 is smaller than the recess or through-hole 46, thus allowing a certain play.

The damping element 18n, 18p, 18r, shown in FIGS. 15A–15B and 16A–16C, may of course be releasably arranged on the drill body 11, in such a way that a movement relative to the drill body is allowed. In this case the screw or screws 40 are substituted for e.g., by a rivet, a glue joint or vulcanization.

Of course, the damping element may comprise more parts than the two, as shown in FIGS. 16A–16C.

Figure 17:
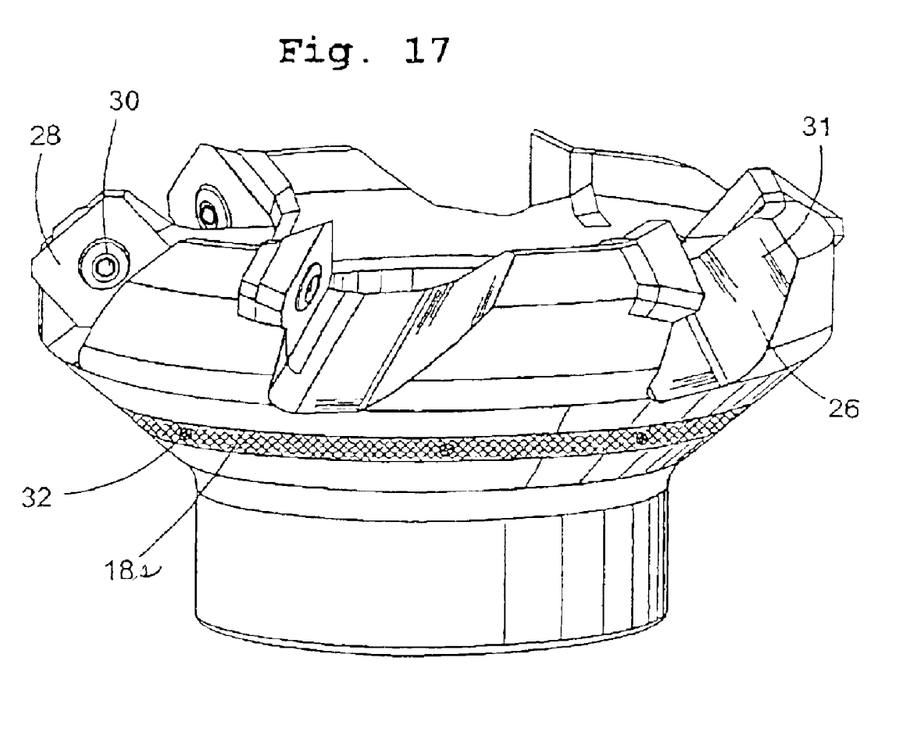
FIG. 17 shows another embodiment of the milling tool of FIG. 13.

FIG. 17 shows the milling body 26 according to FIG. 13, however with an annular damping element 18s attached to the milling body 26 by means of screws 32, allowing a radial play of the thread in relation to the thread of the mounting hole in the milling body 26, such that the desired relative movement of the damping element 18 and the milling body 26 is achieved.

Figure 18:
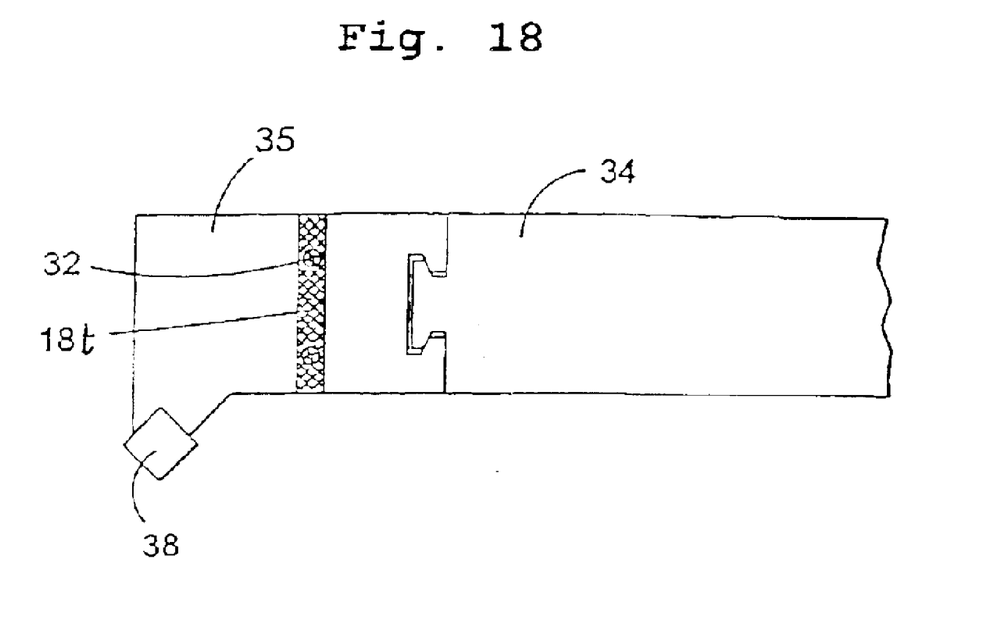
FIG. 18 shows another embodiment of a turning bar.

FIG. 18 shows a turning bar corresponding to the one shown in FIG. 14, however with the difference that the damping element 18t has an annular shape and is arranged about the envelope surface of the cutting head 35. The damping element 18t is arranged in a manner similar to that described in connection with FIG. 17, such that the relative movement of the cutting head 35 and the damping element 18t is made possible.

Figure 19:
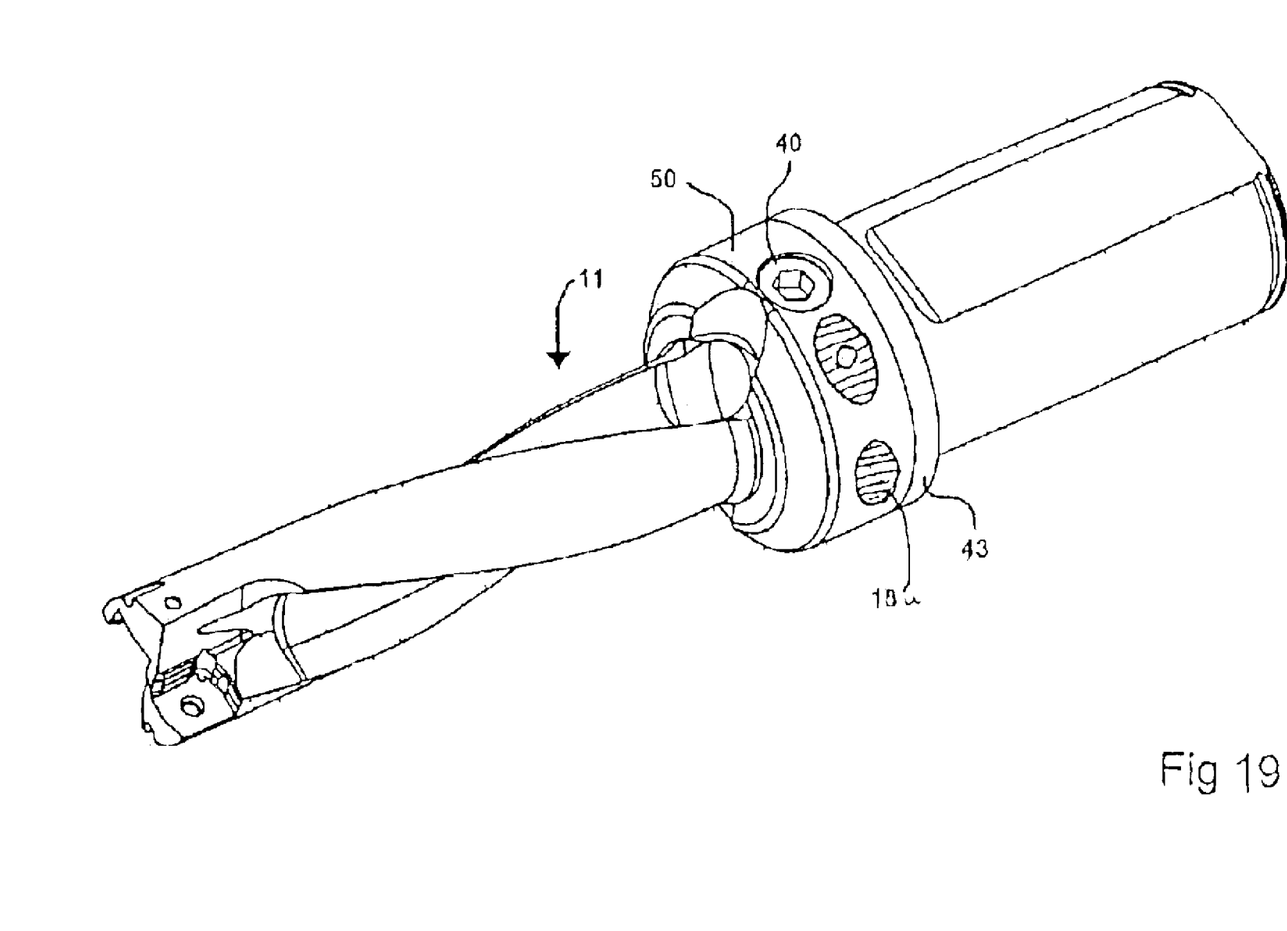
FIG. 19 shows another embodiment of a drilling tool.

FIG. 19 shows a drill tool of the kind shown in FIG. 15B, however with the difference that an exchange module 50 is disconnectably attached to the drill body 11, i.e. the exchange module 50 cannot perform a movement relative to the drill body 11. The exchange module is provided with one or a plurality of damping elements 18u. In accordance with the invention, there are provided a set of exchange modules 50 with different radial extensions and/or different inner diameters for use with different standard sizes of drill tools.

Furthermore, the exchange modules are provided with different number of damping elements 50 and different dimensions thereof, respectively, for achieving different degrees of damping and/or damping frequencies.

The drill bodies shown in FIGS. 1–12 and 14–16 may alternatively comprise an end mill, that also has an elongated circular cylindrical basic shape.

Of course, within the scope of the invention, the position of the damping element or damping elements may vary on or inside the milling body, the drill body and the turning bar, respectively.

Although not shown, the damping element could comprise two pieces, i.e., an inner piece surrounded by an outer piece of less Young's modulus. During rotation of the drill, the inner piece, due to its high mass, will have considerable momentum, whereas the outer piece, being disposed between the drill body and the inner material, will be deformable during acceleration/deceleration especially due to the influence of the inner piece.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A tool for the chip removal of metallic materials, comprising a holder body having at least one seat at its front end for receiving a cutting insert, and damping medium mounted on the holder body for movement relative to the holder body during a cutting operation, wherein the holder body comprises an elongated drill tool comprising a drill body having a number of cooling channels inside each of which the damping medium is disposed.

2. A tool for the chip removal of metallic materials, comprising a holder body having at least one seat at its front end for receiving a cutting insert, and damping medium mounted on the holder body for movement relative to the holder body during a cutting operation, wherein the holder body comprises a drill body having generally axially extending flutes between which bars are formed, wherein the damping medium is shaped and connected to the drill such that it forms part of one of the bars and constitutes part of a boundary surface of a flute.

3. The tool according to claim 2 wherein the flutes extend helically about the axis.

4. A tool for the chip removal of metallic materials, comprising a holder body having at least one seat at its front end for receiving a cutting insert, and damping medium mounted on the holder body for movement relative to the holder body during a cutting operation, wherein the holder body comprises a drill body having external flutes, the damping medium comprising pins located in corresponding cavities in the drill body.

5. A tool for the chip removal of metallic materials, comprising a holder body having at least one seat at its front end for receiving a cutting insert, and damping medium mounted on the holder body for movement relative to the holder body during a cutting operation, wherein the holder body comprises a drill body having flutes formed along the drill body, wherein the damping medium is shaped as a part-cylindrical wall element, enclosing an axial portion of a flute.

6. A tool for the chip removal of metallic materials, comprising a holder body having at least one seat at its front end for receiving a cutting insert, and damping medium mounted on the holder body for movement relative to the holder body during a cutting operation, wherein the holder body comprises a drill body, the damping medium is shaped as an annular member connected to the holder body, wherein the drill body includes a flute extending therealong from the front end, and the annularly formed damping medium is arranged on the drill body without substantially entering said flute.

7. The tool according to claim 6 further including a deformable material disposed between the annular member and the drill body.

8. A damping device adapted to be connected to a holder body of a cutting element, the damping device shaped as an annular member and including a damping medium mounted on the holder body for movement relative thereto, wherein the annular member comprises at least two arc-shaped sections connected together.

* * * * *